June 29, 1971 K. R. HILEMAN 3,589,888
DOUBLE GOB TAKE-OUT ASSEMBLY FOR GLASSWARE
FORMING MACHINES
Filed Oct. 25, 1968 4 Sheets-Sheet 3
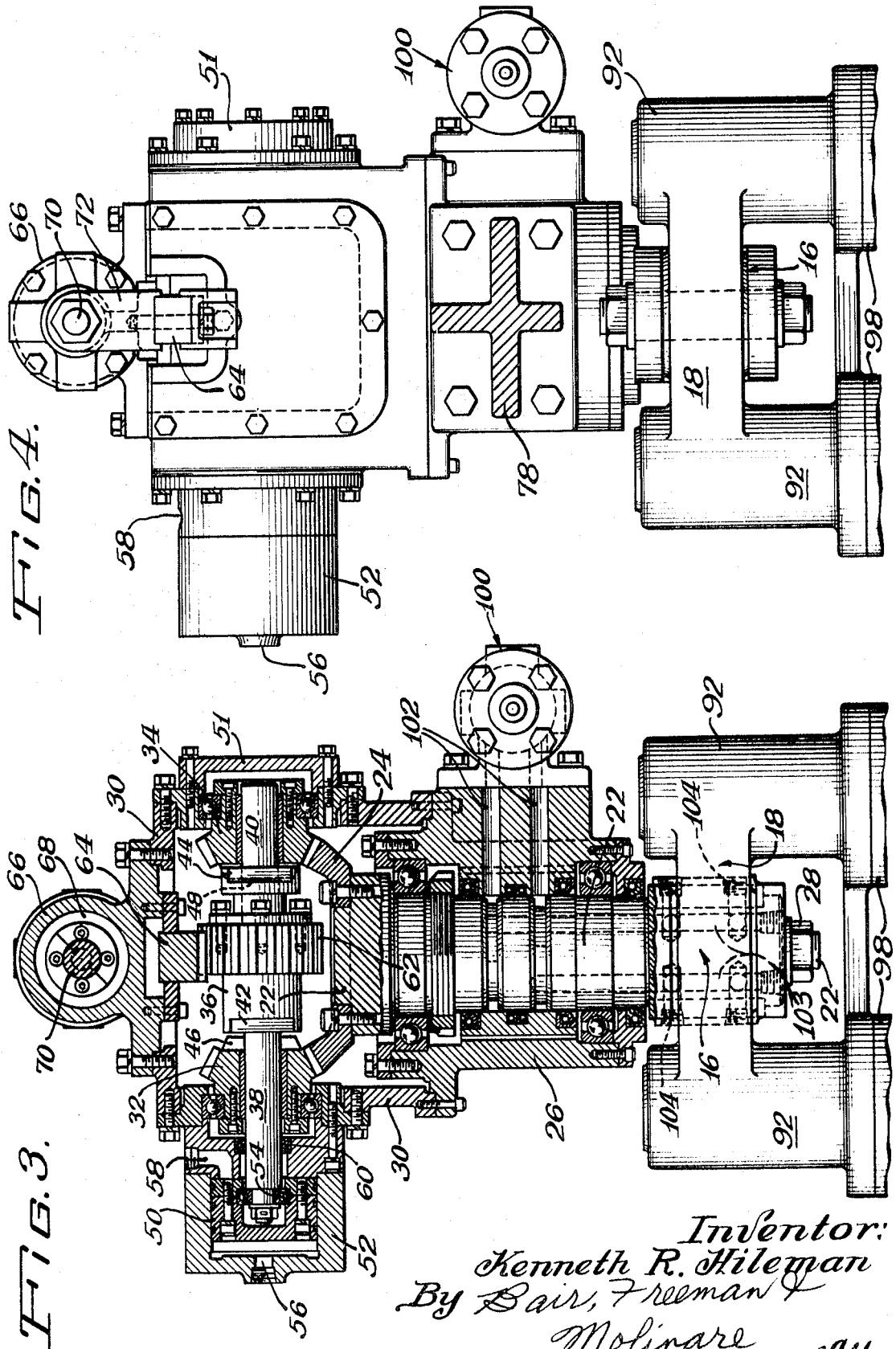
Inventor:
Kenneth R. Hileman
By Bair, Freeman &
Molinare
Attys.

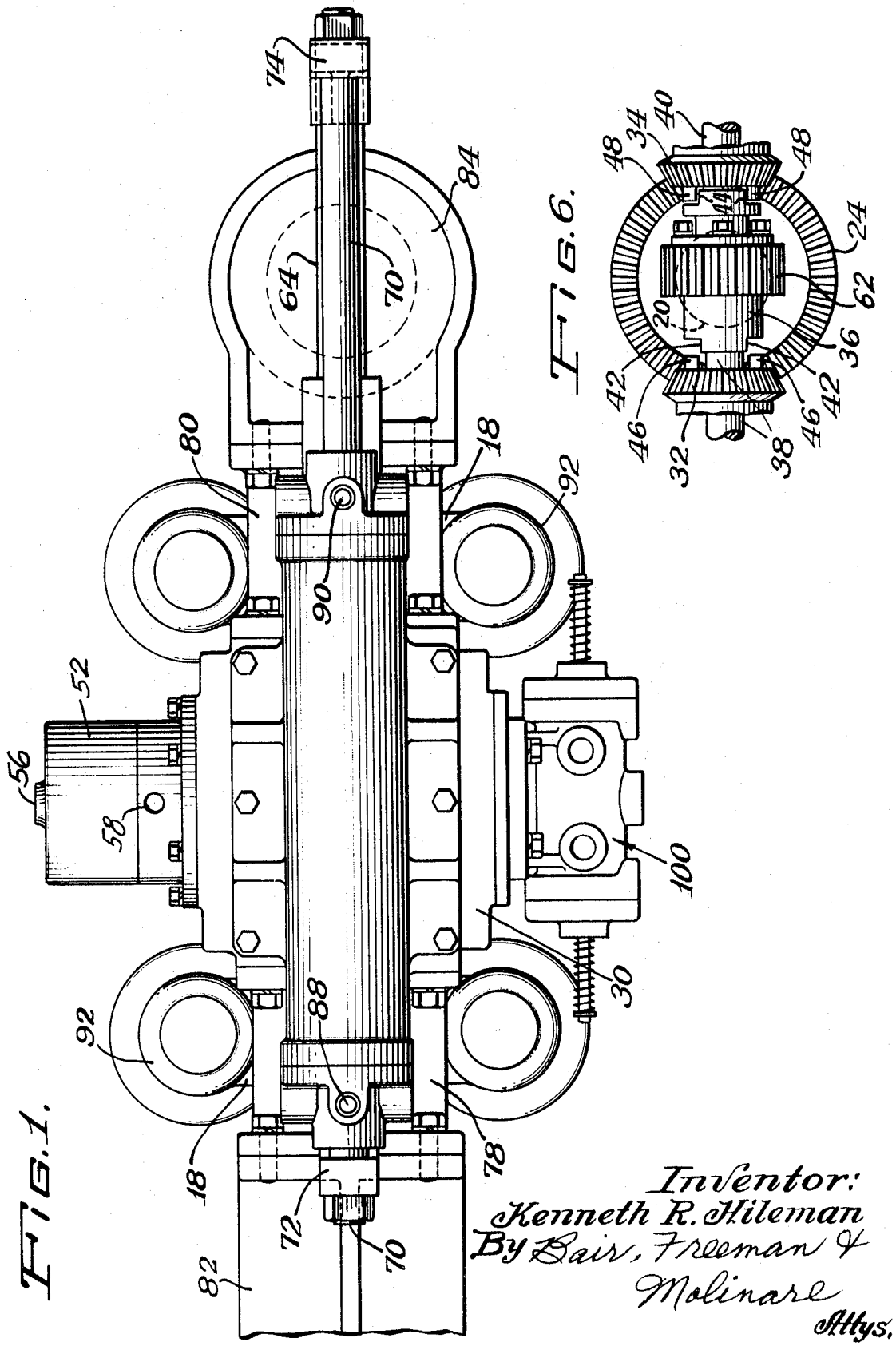

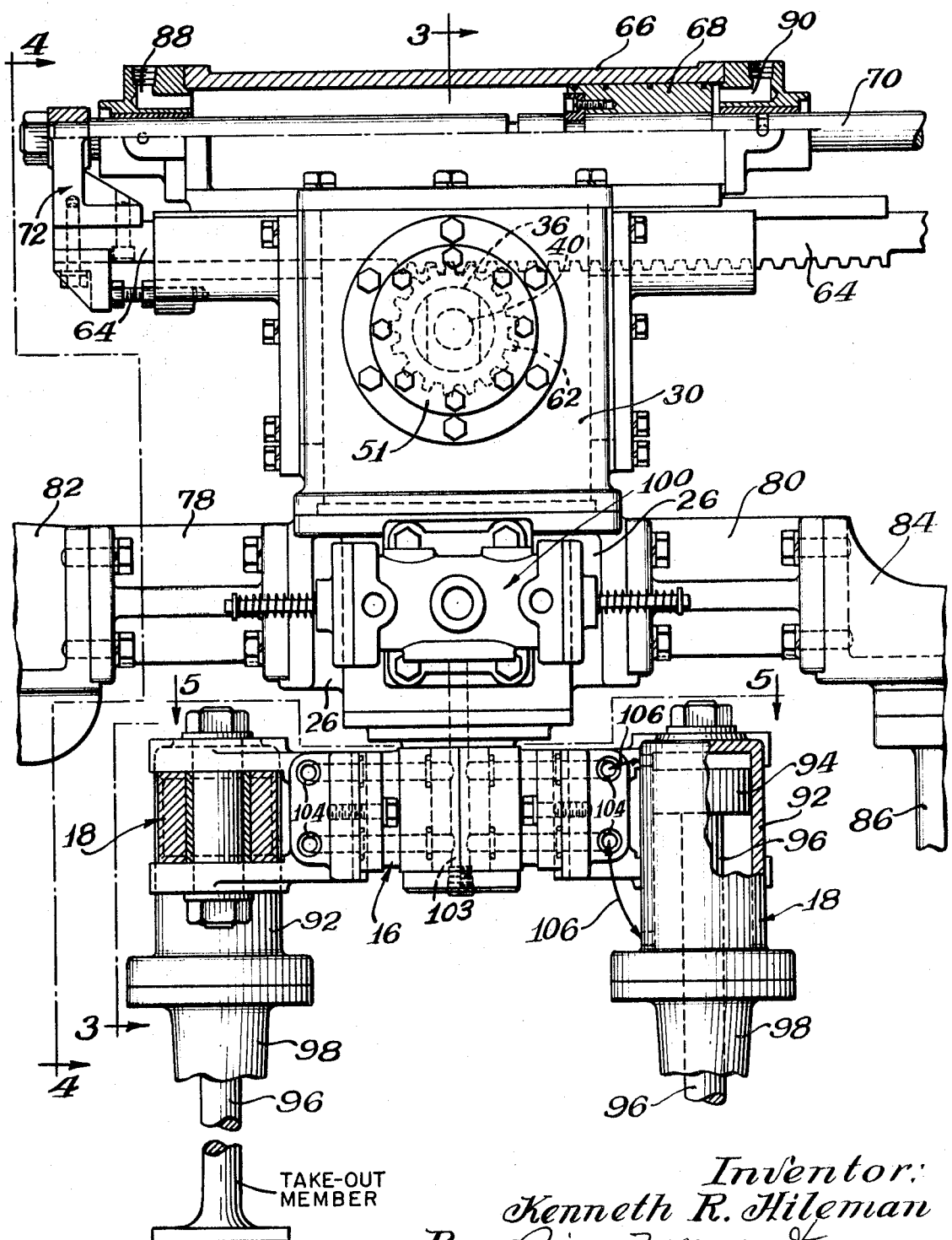

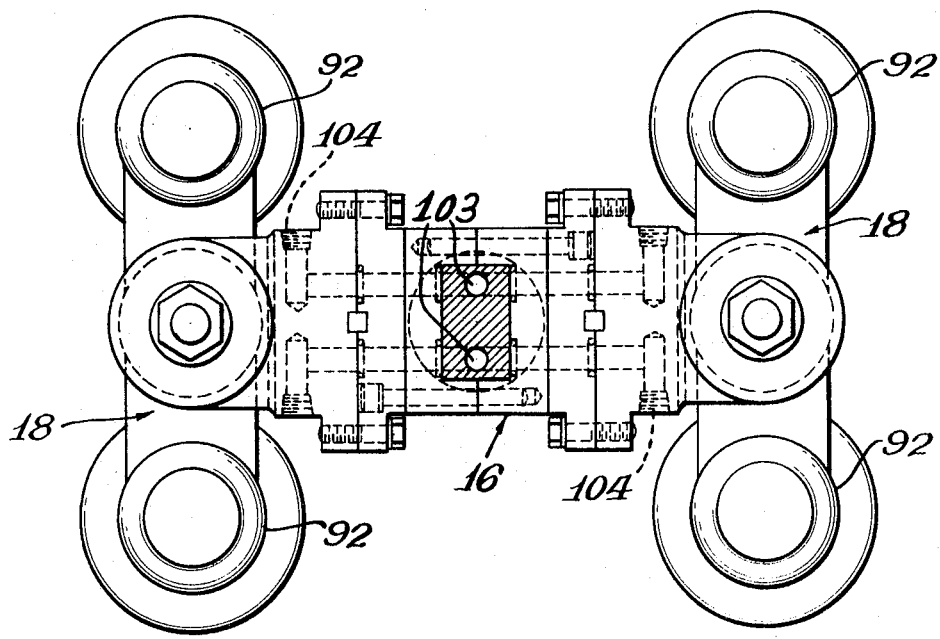
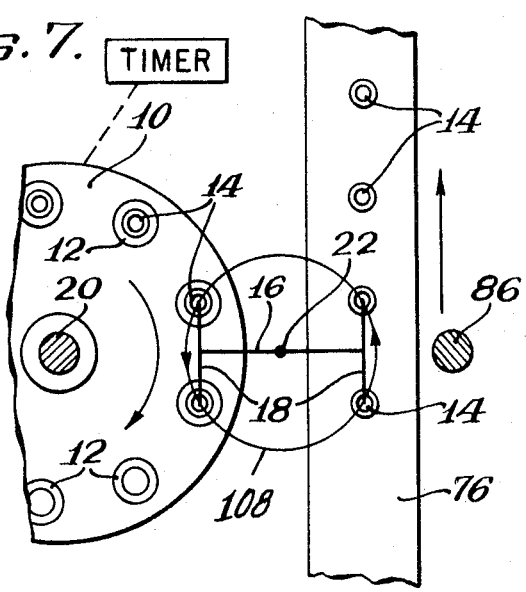

United States Patent Office
3,589,888
Patented June 29, 1971

3,589,888
DOUBLE GOB TAKE-OUT ASSEMBLY FOR GLASS-WARE FORMING MACHINES
Kenneth R. Hileman, Anderson, Ind., assignor to Lynch Corporation, Anderson, Ind.
Filed Oct. 25, 1968, Ser. No. 770,607
Int. Cl. C03b 9/44
U.S. Cl. 65—260                    14 Claims

ABSTRACT OF THE DISCLOSURE

A take-out assembly for glassware forming machines having a shaft-carried rotatable cross arm, each end of the cross arm carrying an engaging and supporting means for a molded article and operable to remove the molded article from a mold of a mold carrier member, oscillate 180° in one direction, and deposit the article on a take-away conveyor. The assembly has a reversing gear arrangement whereby fluid pressure operated means in the form of a cylinder, a piston therein, and a rack and pinion connection with a bevel gear on the cross arm shaft oscillates the shaft in one direction in one cycle of operation of the glassware forming machine and in the opposite direction in the next cycle thereof, automatic clutching means being provided for clutching one bevel pinion to the rack pinion during the first cycle and another bevel pinion to the rack pinion during the second cycle, the two bevel pinions being in mesh with the bevel gear on the rotatable cross arm shaft whereby it is rotated 180° in one direction during the first cycle and 180° in the same direction during the second cycle.

BACKGROUND OF THE INVENTION

Heretofore reciprocating type take-out assemblies for glassware forming machines have been provided as evidenced for example in Langner Pat. No. 2,268,075 and Hendricks Pat. No. 2,725,154. For high speed production, reciprocating elements traveling over a distance necessary from take-out station to a take-away conveyor are prohibitive because of the forces of momentum and inertia. Accordingly any reduction in travel can be attended by an equivalent increase in production.

One object of the present invention is to provide a design of take-out assembly which reduces travel distances when compared to a straight-away or reciprocating type of take-out assembly moving between take-out station and a point of deposit on a take-away conveyor.

More specifically, an object is to provide an assembly of this general character particularly adapted for a Lynch model MDP (Motor Driven Press). Any type of take-out elements may be provided in the form of molded article engaging and supporting members, and my assembly includes, for each end of the oscillatable cross arm, a vertically reciprocable fluid pressure operated mechanism such as one of cylinder and piston type which is operable to close and open take-out tongs or operate other types of take-out mechanism suitable for the particular ware being molded.

Another object is to provide take-out members mounted on opposite ends of a rotatable cross arm, and to rotate the cross arm by a reciprocating rack and a pinion mechanism wherein the rack is driven by a piston within a cylinder so that the pinion, which meshes with the rack, is oscillated, and intermediate mechanism between the pinion and the rotatable cross arm being provided which rotates the cross arm 180° in one direction during one cycle of operation of the glassware forming machine when the piston drives the rack in one direction and through a reversible connection rotates the cross arm 180° in the same direction during the next cycle when the piston reciprocates in the opposite direction.

A further object is to provide means for depressing and operating take-out tongs or any other suitable pick-up element on the outer end of the cross arm at the take-out station, or lowering a vacuum pick-up element into engagement with a molded article to be picked up, and then to retract the pick-up element for lifting the article whereupon it is moved by 180° of rotation of the cross arm to the take-away conveyor and released thereon, the pick-up element being then raised for return to the take-out station in the next cycle of operation of the glassware forming machine.

Another object is to provide take-out mechanisms mounted on opposite ends of a rotatable cross arm and to rotate the cross arm by means of a bevel gear with which a pair of bevel pinions are meshed and alternately engageable with an oscillatable pinion in successive cycles of operation of the glassware forming machine, fluid pressure operated clutch mechanism being provided to effect engagement with one bevel pinion during one cycle of operation of the machine, and to effect engagement with the other bevel pinion during the next cycle thereof.

Still another object is to provide automatic means for controlling engagement of the clutch mechanism in successive cycles of operation of the glassware forming machine.

A further object is to provide means for rotating a bevel gear of the cross arm by rotating bevel pinions meshing therewith comprising a pinion with which a rack meshes, the rack being oscillated in successive cycles of the glassware forming machine in one direction in one cycle and in the opposite direction in the next cycle.

BRIEF SUMMARY OF THE INVENTION

A support is provided which is clamped to a stationary center shaft for the mold carrying table of a glassware forming machine and extends radially therefrom to a position first over the take-out station of the table and then over a take-away conveyor. A vertical shaft is journalled on the support between the take-out station and the take-away conveyor and is rotated by means of a pinion meshing with a rack which is fluid pressure reciprocated. Molded article engaging and supporting elements of suitable type are supported by the ends of cross arm which is rotated 180° in one direction during a take-out cycle of the glassware forming machine and 180° in the same direction during the next take-out cycle, the rotations being alternately repeated. Fluid is automatically supplied at the take-out station where means is provided to lift the article out of the mold, and the article is held thereby until it reaches the take-away conveyor whereupon the article is released for deposit thereon.

BRIEF DESCRIPTION OF THE DRAWINGS

FIG. 1 is a plan view of a take-out assembly embodying my invention, the same being illustrated as of the double gob type.

FIG. 2 is a side elevation thereof with certain portions broken away and other portions shown in section.

FIG. 3 is a vertical sectional view on the line 3—3 of FIG. 2.

FIG. 4 is a vertical sectional view on the line 4—4 of FIG. 2.

FIG. 5 is a horizontal sectional view on the line 5—5 of FIG. 2.

FIG. 6 is a plan view of certain gearing within a gear box adjacent the top of FIG. 3; and FIG. 7 is a diagrammatic view of a glassware forming machine table and a take-away conveyor together with a diagram of the major elements of my take-out assembly to indicate a typical operation thereof.

DESCRIPTION OF THE PREFERRED EMBODIMENT

On the accompanying drawings I have used the reference numeral 10 (referring first to FIG. 7) to indicate a mold carrying member such as an intermittently rotating 9-mold table of a glassware forming machine, a stationary vertical shaft being shown at 20. Press molds 12 are carried by the table 10 in which relatively large glassware articles 14 are press-molded such as tumblers, small flatware, and the like. A primary cross arm 16 is shown diagrammatically having secondary cross arms 18, a shaft for supporting the primary cross arm 16 being shown at 22. The parts 16, 18 and 20 (as to their physical characteristics) are shown in FIGS. 1 to 6 of the drawings.

Referring to FIG. 3, the shaft 22 extends from a bevel gear 24, which is secured thereto by cap screws as illustrated, downwardly through a bearing housing 26 in which it is journalled by means of ball bearings, the shaft being of several different diameters, and through the cross arm 16. The shaft 22 has a nut 28 threaded on its lower end to retain the cross arm assembled relative to the shaft.

Surmounting the bearing housing 26 is a gear housing 30 in which bevel pinions 32 and 34 are journalled, and mesh with the bevel gear 24. A shaft 36 is shown between the bevel gears and has reduced ends 38 and 40. As also shown in FIG. 6, flats 40 and 42 are provided on the shaft 36 for clutching alternate coaction with clutch jaws 46 and 48 respectively formed on the bevel pinions 32 and 34.

The shaft 36, 38, 40 is adapted to be shifted toward the right to the position shown in FIG. 3, and also toward the left, by means of a piston 50 in a cylinder 52, a thrust bearing connection 54 being provided for connecting the reduced end 38 to the piston. Ports 56 and 58 admit pressure to the cylinder 52 outside the piston 50 and underneath it respectively, a shaft seal 60 being provided to prevent fluid pressure escape from the inner end of the cylinder along the reduced end 38 of the shaft 36 in an obvious manner.

A pinion 62 is secured to a flange of the shaft 36 and is oscillated by a rack 64. The means for oscillating the rack is shown in FIG. 2 and comprises a cylinder 66 in which a piston 68 is reciprocable. Ports 88 and 90 are provided for opposite ends of the cylinder 66 as shown in FIG. 2 so that fluid pressurec an be properly introduced for reciprocating the piston rod 70 and thereby the rack 64 for oscillating the pinion 62 which meshes therewith. The piston in turn reciprocates a piston rod 70 connected by a bracket 72 to the left hand end of the rack 64 as shown, and to the right hand end of the rack by a similar bracket 74 shown in FIG. 1.

For supporting the entire assembly with respect to the mold carrying table 10 and a take-away conveyor 76 shown diagrammatically in FIG. 7, brackets 78 and 80 are connected to the bearing housing 26 as shown in FIG. 2, and further brackets 82 and 84 are connected to the brackets 78 and 80 respectively. The bracket 82 is suitably connected to the stationary shaft 20 in a manner similar to that shown in my copending application Ser. No. 761,108, filed Sept. 20, 1968. The bracket 84 may be supported on an outboard post 86 shown in FIG. 2, and also in FIG. 7 just beyond the take-away conveyor 76.

The ends of the secondary cross arms 18 terminate in cylinders 92 in which pistons 94 are reciprocable, the pistons being provided with piston rods 96 which are operable to actuate take-out tongs or other take-out devices, or raise and lower vacuum take-out heads such as shown in my copending application above referred to, and which form no part of my present invention and are therefore not shown and described. For actuating the pistons 94 in the cylinders 92, fluid pressure may be utilized and may be under the control of a control valve 100 shown in FIGS. 1 and 2. The control valve in turn is automatically actuated from the usual timer of the glassware forming machine. Likewise the flow of fluid pressure to and from the ports 56 and 58, and the ports 88 and 90, may be controlled by other valves of the glassware forming machine timer in the usual manner.

FIGS. 2 and 3 show, mostly in dotted lines, a passageway system beginning with passageways 102 shown in FIG. 3 and leading from the control valve 100, to and through the shaft 22 and then through the arms 16 to ports 104 shown in FIG. 2 from which hose connections 106 (shown diagrammatically) lead to the upper and lower ends of the cylinder 92.

Passageways 102 lead from the control valve 100 as shown in FIG. 3, and communicate with passageways 103 in the shaft 22 which terminate in ports 104 shown in FIGS. 2 and 3, and these ports are connected by flexible hoses 106 (only two of them shown diagrammatically in FIG. 2) leading to the opposite ends of the cylinders 92.

PRACTICAL OPERATION

Referring to FIG. 7, press molds 12 on the mold carrier table 10 have molded articles 14 molded therein, and the right hand two articles 14 on the table are ready for take-out. Two articles 14 have already been delivered to the take-away conveyor 76, and two have been advanced away from the delivery position thereof on the conveyor.

The cross arm 16 and the secondary cross arms 18 are shown in one position wherein the left hand two articles 14 are being taken out of the molds 12 and the right hand two articles 14 are being delivered to the conveyor belt. After pick up of the articles at the left and release of the articles at the right, the take out members 98 are ready for rotation, the circle of rotation thereof being shown at 108. Rotation is indicated counterclockwise, thus being on the left side of the circle in the same direction as rotation of the table 10 and on the right side in the same direction of movement as the conveyor 76 so as to cause least disturbance to the articles being picked up and released. 180° of rotation is effected by reciprocation of the piston 68 by proper introduction of fluid pressure at 88 or 90 as the case may be during one cycle of operation of the glassware forming machine. During the next cycle of operation rotation is in the same direction even though the rack 64 reciprocates in the opposite direction, being effected of course by the proper timing operation for disengaging one clutch and engaging the other in the gear housing 30 by proper flow of fluid pressure either to the port 56 or the port 58 of the cylinder 52 as the case may be. Also at the proper time the machine timer actuates the valve 100 for pick up or release of the respective article engaging devices of the take-out members 98 and actuated by the piston rods 96.

Since two take-out elements are illustrated so as to pick up molded articles from two molds at one time, the table 10 is advanced the equivalent of two molds each take-out cycle. This arrangement of course doubles the production without increasing the time for take-out.

I claim as my invention:

1. A take-out assembly for a glassware forming machine wherein a mold carrier member periodically presents molded articles at a take-out station for transfer to a take-away conveyor; said take-out assembly comprising a support, a vertical rotating shaft journalled in said support, a cross arm mounted on said shaft, means on each end of said cross arm for engaging and supporting molded articles, and reciprocal means constructed and arranged, while moving in one reciprocal direction, for rotating said cross arm 180° in one direction during one cycle of take-out of the glassware forming machine, and, while moving in the other reciprocal direction, for rotating said cross arm another 180° in the same direction in the next take-out cycle thereof.

2. A take-out assembly for glassware forming machines in accordance with claim 1 wherein said means for rotating said cross arm includes a rack and pinion connection with said cross arm, said connection includes a first gearing arrangement operable during one cycle of take-out of the glassware forming machine, to rotate said cross arm in said one direction, and includes a second gearing arrangement operable during the next take-out cycle thereof, said second gearing arrangement being rotatable in a reverse direction from said first gearing arrangement for rotating said cross arm in said same direction.

3. A take-out assembly for glassware forming machines in accordance with claim 2 wherein said reciprocable means and thereby said rack is fluid pressure operated.

4. A take-out assembly for glassware forming machines in accordance with claim 3 including a glassware forming machine timer, and said fluid pressure means is under control of said glassware forming machine timer.

5. A take-out assembly for glassware forming machines in accordance with claim 2 wherein said first and second gearing includes a pair of bevel pinions actuated by said rack and pinion, and a bevel gear meshing with said bevel pinions and mounted on said vertical rotatable shaft.

6. A take-out assembly for glassware forming machines in accordance with claim 5 wherein a pair of clutch connections are interposed between said rack pinion and said bevel pinions, one clutch connection of the pair being operable in said one cycle and the other clutch connection thereof being operable in said next cycle.

7. A take-out assembly for glassware forming machines in accordance with claim 6 wherein said reciprocable means and thereby said rack and pinion connection is fluid pressure operated.

8. A take-out assembly for glassware forming machines in accordance with claim 7 including a glassware forming machine timer, and said fluid pressure means is under control of said glassware forming machine timer.

9. A take-out assembly for glassware forming machines in accordance with claim 1 including a take-out member, and means are provided at said take-out station for operating said take-out member to first engage an article which has been molded and to then raise the article out of the mold at the take-out station.

10. A take-out assembly for glassware forming machines in accordance with claim 9 wherein said operating means actuates said take-out member to finally release the molded article onto the take-away conveyor.

11. A take-out assembly for glassware forming machines in accordance with claim 1 wherein said reciprocal means comprises fluid pressure operated rack and pinion means.

12. A take-out assembly for glassware forming machines in accordance with claim 11 including forward gearing operatively interconnected to said rack and pinion means, which in one cycle of machine, rotates in said one direction, and, reverse gearing, also operatively interconnected to said rack and pinion means, which in the next cycle of the machine, rotates in the opposite direction.

13. A take-out assembly for glassware forming machines in accordance with claim 12 wherein said forward gearing and said reverse gearing have clutch connections with said rack and pinion means wherein the clutch connections alternate for the forward gearing in one cycle and the reverse gearing in the next cycle.

14. A take-out assembly for glassware forming machines in accordance with claim 13, including a glassware forming machine timer, and fluid pressure means is provided to operate said clutch connections and is under control of said glassware forming machine timer.

References Cited

UNITED STATES PATENTS

| 2,888,131 | 5/1959 | Allen | 65—260X |
| 3,175,704 | 3/1965 | McCreery | 65—260X |

S. LEON BASHORE, Primary Examiner

S. R. FRIEDMAN, Assistant Examiner

U.S. Cl. X.R.

65—239; 214—1